United States Patent
Eldridge et al.

[11] Patent Number: 6,064,492
[45] Date of Patent: May 16, 2000

[54] IMAGE DATA INTERFACE BETWEEN DIGITAL FRONT END AND PRINTER

[75] Inventors: George L. Eldridge, Long Beach; San A. Phong, Cerritos; Yuanta Kuo; Munir G. Salfity, both of Torrance, all of Calif.

[73] Assignee: Xerox Corporation, Stamford, Conn.

[21] Appl. No.: 09/087,818

[22] Filed: May 29, 1998

[51] Int. Cl.[7] .................................................. G06F 15/00
[52] U.S. Cl. ........................................... 358/1.15; 358/1.9
[58] Field of Search ..................... 358/1.15, 1.9, 358/1.13, 1.14, 1.1, 1.16, 1.17, 1.18, 1.6, 1.2, 1.4, 1.5, 468, 442, 434, 435, 436, 437, 438, 439, 407, 501, 504, 515, 516, 530, 406, 444, 404; 347/3, 5; 399/1–2, 8; 710/1, 8, 14–16, 19–20, 62, 72

[56] References Cited

U.S. PATENT DOCUMENTS

| | | | |
|---|---|---|---|
| 5,185,853 | 2/1993 | Cheng et al. | 358/1.16 |
| 5,438,648 | 8/1995 | Takaoka et al. | 358/1.6 |
| 5,440,410 | 8/1995 | Sugishima | 358/435 |
| 5,507,003 | 4/1996 | Pipkins | 358/1.15 |
| 5,630,029 | 5/1997 | Kosukegawa | 358/1.15 |
| 5,680,596 | 10/1997 | Iizuka et al. | 358/1.15 |
| 5,704,023 | 12/1997 | Kim | 358/1.14 |
| 5,754,746 | 5/1998 | Blurfrushan et al. | 358/1.18 |
| 5,884,014 | 3/1999 | Huttenlocher et al. | 358/1.15 |
| 5,909,539 | 6/1999 | Chikauchi | 358/1.13 |
| 5,946,459 | 8/1999 | Plakosh | 358/1.17 |
| 5,970,220 | 10/1999 | Bolash et al. | 358/1.15 |
| 5,978,560 | 11/1999 | Tan et al. | 358/407 |

*Primary Examiner*—Dov Popovici
*Attorney, Agent, or Firm*—Robert Cunha

[57] ABSTRACT

A high speed image data interface between a print server containing a page description language decomposer and an interface card, and a printer containing a rendering card and a print engine, where the interface card is physically located in the printer case and is plugged into the backplane of the printer. The interface is synchronous and carries clock, page request, line request and reset signals from the renderer, and line valid, error and data signals from the interface card. Other communications between the printer and server are carried by a telephone line or local area network. The advantage of this arrangement is that the printer manufacturer can design the printer without having to design the interface card to match the server manufacturer's requirements.

3 Claims, 7 Drawing Sheets

| PIN # | ROW A | ROW C |
|---|---|---|
| 1 | DDClk | DDFE_PageReq' |
| 2 | GND | DLineReq' |
| 3 | DError' | DIReset' |
| 4 | DIData00 | DIData01 |
| 5 | DIData02 | DIData03 |
| 6 | DIData04 | DIData05 |
| 7 | DIData06 | DIData07 |
| 8 | DIData08 | DIData09 |
| 9 | DIData10 | DIData11 |
| 10 | DIData12 | DIData13 |
| 11 | DIData14 | DIData15 |
| 12 | GND | GND |
| 13 | DIData16 | DIData17 |
| 14 | DIData18 | DIData19 |
| 15 | DIData20 | DIData21 |
| 16 | DIData22 | DIData23 |
| 17 | DIData24 | DIData25 |
| 18 | DIData26 | DIData27 |
| 19 | DIData28 | DIData29 |
| 20 | DIData30 | DIData31 |
| 21 | DITag0-0 | DITag0-1 |
| 22 | DITag0-2 | DITag0-3 |
| 23 | DITag1-0 | DITag1-1 |
| 24 | DITag1-2 | DITag1-3 |
| 25 | DITag2-0 | DITag2-1 |
| 26 | DITag2-2 | DITag2-3 |
| 27 | DITag3-0 | DITag3-1 |
| 28 | DITag3-2 | DITag3-3 |
| 29 | DPU21-0 | DPU21-1 |
| 30 | DPU21-2 | DPU21-3 |
| 31 | DiLine_Valid' | SpareD1 |
| 32 | +5V | +5V |

*FIG. 7*

IMAGE DATA INTERFACE BETWEEN DIGITAL FRONT END AND PRINTER

BACKGROUND OF THE INVENTION

An image data interface between a printer and its server, or digital front end (DFE), which specifies the data to be transferred between an interface card in the printer which is electrically connected to the digital front end and the rendering, halftoning, card in the printer which halftones the image, the interface data including contone image data, printing hints and page and line start signals.

How to optimally connect various computer peripherals to a computer has been a continuing problem. A computer usually has a backplane which provides a standard interface between cards, and a peripheral such as a disk drive may be sold with an interface card that communicates between the drive and the backplane. In this case, the backplane is the interface.

A different configuration is used in a modem networked printer. The generation of a page containing text and image data frequently starts at a terminal where the user generates a computer generated graphic or receives a contone image from a scanner, generates text, combines image and text in a highly compressed form using a page description language (PDL), and sends the result to a printer server, a DFE, which is usually located somewhere near the printer. Here, a decomposer expands the PDL into separations of bit maps and sends the resultant video over wire or fiber cables or a network to the printer. Finally, the printer has an interface card which reformats the data into rasters, halftones them in a rendering card, and applies them to the raster output scanner (ROS). In this case, the interface is the connection between the server and the printer.

The problem with this system is that different server manufacturers build their servers to output over different systems, like wire or fiber, cable or networks, using different data protocols, and this puts a large burden on the printer manufacturer to design the printer to accept the interface restrictions of the server or servers being used.

SUMMARY OF THE INVENTION

This invention provides for the interface to be between an interface card and the rendering card. Both are within the printer, but the interface is now separate from the backplane. Also, the server manufacturer, who designed the transmitter for the means of communication between the server and printer, also designs the receiver. This is a much more efficient method of designing a networked printing system since the server manufacturer who already has the expertise in designing, for example, a fiber optic network transmitter can conveniently design the receiver as well, allowing the printer designer to concentrate on the design of the printing mechanism. In this case, the printer designer specifies the interface signals, such as the number of data lines, and the ancillary clock, reset, error, page and line signals, and the server manufacturer designs the interface card to produce these signals from its own server output. The result is an interface card which plugs into the backplane of the printer, and has a connection, of any type, to the server.

For high end color printers which handle four or more separations, one interface card and one rendering card would be used for each separation.

The interface being described here is a high speed image data path, and exists in addition to a more usual connection, such as a local area network, over which the print engine and DFE can communicate. For example, negotiations between the front end and the print engine are handled over the network connection.

BRIEF DESCRIPTION OF THE DRAWINGS

FIG. 7 is a diagram of the pin assignments of the various signals of the interface.

DETAILED DESCRIPTION OF THE INVENTION

Figure 1:
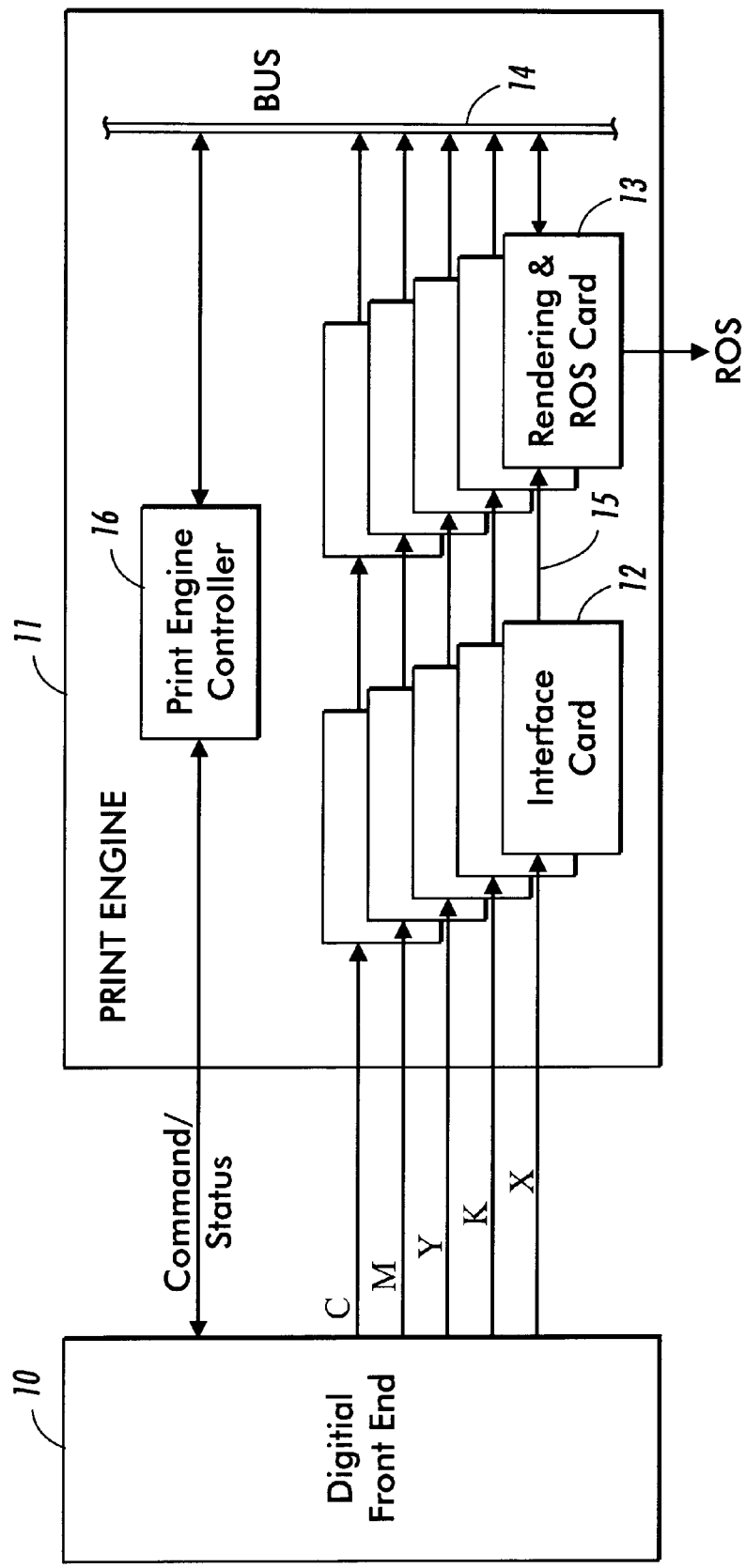
FIG. 1 is a block diagram of the system.

FIG. 1 is an overall block diagram of the system. The digital front end 10 decomposes page description language and sends a number of separations of byte maps of contone video to the interface cards 12 by any means at the convenience of the DFE manufacturer. The separations are assumed to be cyan, magenta, yellow, black and one other, as shown. The interface 15 is between each interface card 12 and its corresponding rendering card 13. That output is then applied to the printer backplane or bus 14 for application to the print engine controller 16.

Figure 2:
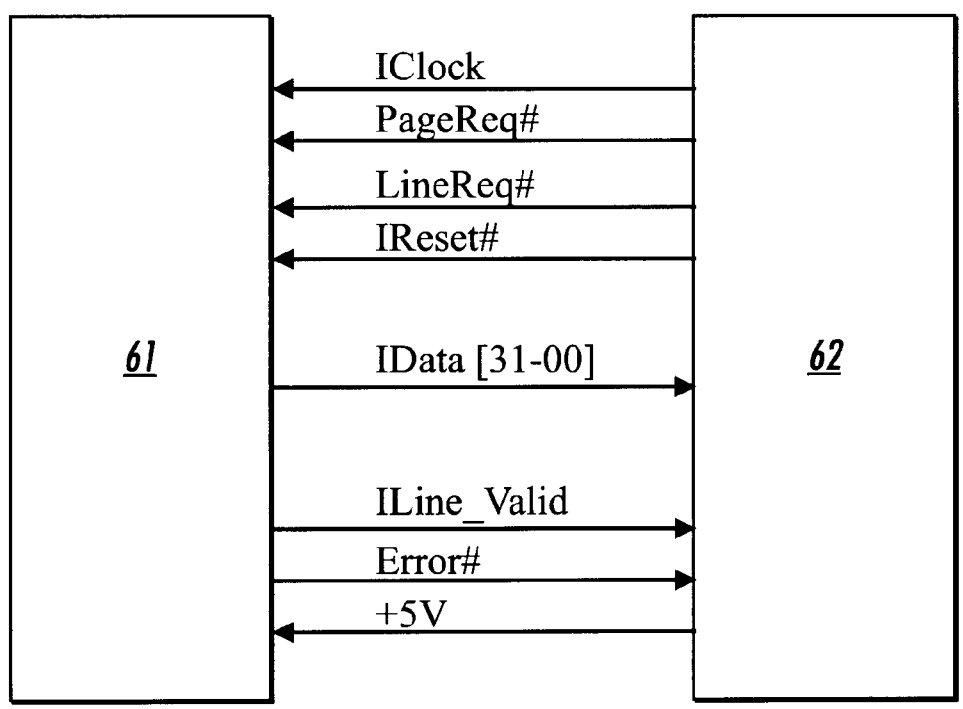
FIG. 2 is a wiring diagram of the interface.

As shown in FIG. 2, the 60 line interface in this described embodiment has 32 data lines, one each reset, clock, error, line valid, line request and page request lines and several power and ground lines. The data, line valid, and error signals go from the interface card 61 to the rendering card 62 while the remainder go from the rendering cad to the interface card.

Data transfer across the interface occurs when the page request, line request and line valid signals are active. The page request signal is driven active by the rendering card to indicate the start of a new page of data. The line request signal is driven active by the rendering card to indicate that data transfer should commence. Within several clock edges following the activation of the line request, the interface card must drive image data onto the data lines and drive line valid. On the next clock edge the rendering card will latch the image data on the data lines. The interface card must drive a new set of image data onto the data lines every clock cycle until the entire line of data has been transferred. The interface card will stop driving new data out on the bus when all of the data for an entire line has been transferred. The interface card will also deactivate line valid.

The rendering card deactivates the line request. The next scan line of image data is transferred when the line request again goes active. This process repeats until all of the scanlines for the image have been transferred All image data transfers must be multiples of four pixels.

At the end of the image, the rendering card will deactivate the page request signal. The interface card must then check that exactly the correct amount of image data was transferred. If there was image data left over, or if there was not enough image data, then the interface asserts the error signal. The interface card will also assert the error signal if it detects any kind of problem during the transfer of the image data. It is the responsibility of the print engine controller to perform recovery and reset the error signal.

Figure 3:
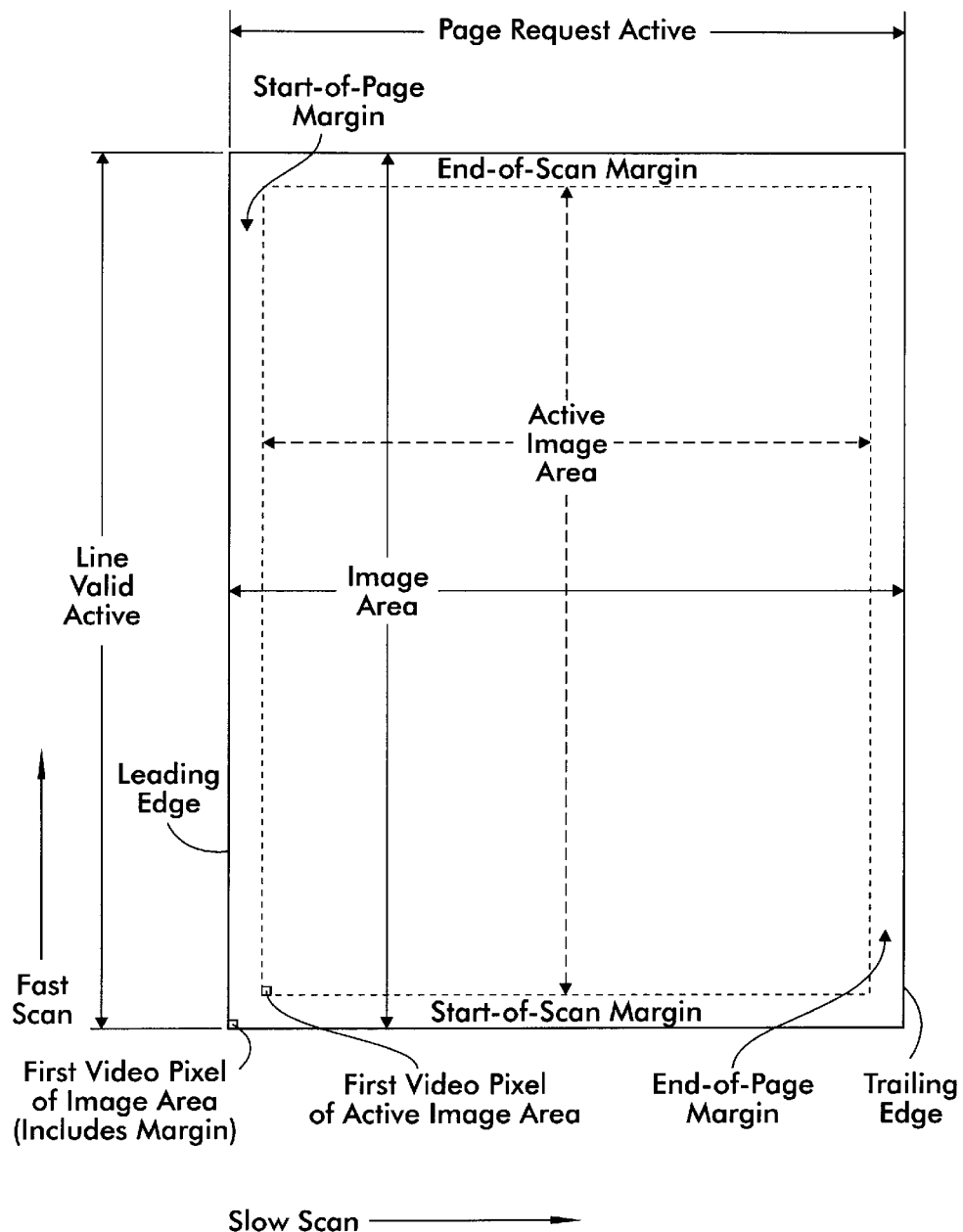
FIG. 3 shows the spatial relationships for imaging.

The image data interface signals are described with respect to the following spatial imaging conventions, which must be followed by the front end and print engine. The interface-supplied image is a rectangular image space whose sides are parallel to the slow scan and fast scan directions of the print engine. FIG. 3 shows the generalized relationships when viewing the imaged side of the paper. The first pixel delivered to the image is located at the lower left hand corner, as viewed from the start-of-scan edge. The fast and slow scan proceed upward and to the right, respectively. Active image data is the image information that is intended to appear on the paper. It is the responsibility of the front end to align the page image data within the interface supplied frame so that it is imaged on the paper.

There are four margins shown in FIG. 3; start-of-page margin, end-of-page margin, start-of-scan margin, and end-of-scan margin. The interface card must supply data for these margins. The start-of-page margin is created by sending background data (no ink) for the first m scan lines. The end-of-page margin is created by sending background data for the last n scan lines of the page. The start-of-scan margin is creaked by sending background data for the first s pixels in the scan line. The end-of-scan margin is created by sending background data for the last t pixels in the scan line. The values of m, n, s and t are negotiated by the front end and the printing engine. The print engine is responsible for providing any margins necessary to cover the print engine registration tolerance. The front end is responsible for providing all other margins. The margins must be white (no ink). The front end will negotiate the margins and paper registration location.

With respect to the individual control signals carried by the interface, the image clock is generated by the rendering card and sent to the interface card It is a free-running clock. Both the sender and receiver use this clock to synchronize all signals. All signals are sampled on the rising edge of the clock The page request signal is generated in the rendering card and sent to the interface card. It defines each slow scan imaging interval to the interface card in real time. Its primary purpose is to synchronize the delivery of an image frame worth of video data to the rendering card. The interface card must deliver a page worth of video data for each page request received. The duration of page request defines the page size in the slow scan direction. The beginning of the page request must correspond to the leading edge of the paper, and the end of page request must correspond to the trailing edge of the page. The interface card must be capable of delivering scan lines containing page image data starting with the second line request following the beginning of each page request.

The line request is generated in the rendering card and sent to the interface card. It defines each fast scan imaging interval to the interface card in real tune. It synchronizes the delivery of a scan line worth of video data to the rendering card. Line request going active marks the nominal start of the largest image size in the fast scan direction. Line request is a free-running signal and occurs even when page request is inactive.

The line valid is generated in the interface card and sent to the rendering card to indicate that the data on the data lines is valid. This signal must be activated within a specified number of clocks following the receipt of the line request signal. The line valid remains activated until an entire line of data has been transferred The error signal is generated in the interface card and sent to the rendering card to indicate an error condition. The interface card shall assert the error signal no later than 256 clocks upon detecting the error condition. It is the responsibility of the print engine to take appropriate action. The possible errors are described as follows:

(1) Image data not ready: the interface card shall assert the error when page request and line request are sampled active without valid image data available to send after a certain latency specified as a number of clocks has elapsed. This can be caused by the front end failing to deliver image data on time.

(2) Page request termination: the interface card shall assert error when page request is terminated by the rendering card in the middle of a data transfer while line request is active or the interface card still has more scan lines of data to transfer.

(3) Page abort: a catastrophic error detected by the interface card that requires printing of the current page to be aborted.

The reset signal is generated by the rendering card to reset the interface card. The typical use of this signal is to reset the error signal generated by the interface card and to put the interface card into a known state. To properly reset the error signal and internal logic on the interface card, the reset signal needs to be active for a minimum of 20 clocks.

Figure 4:
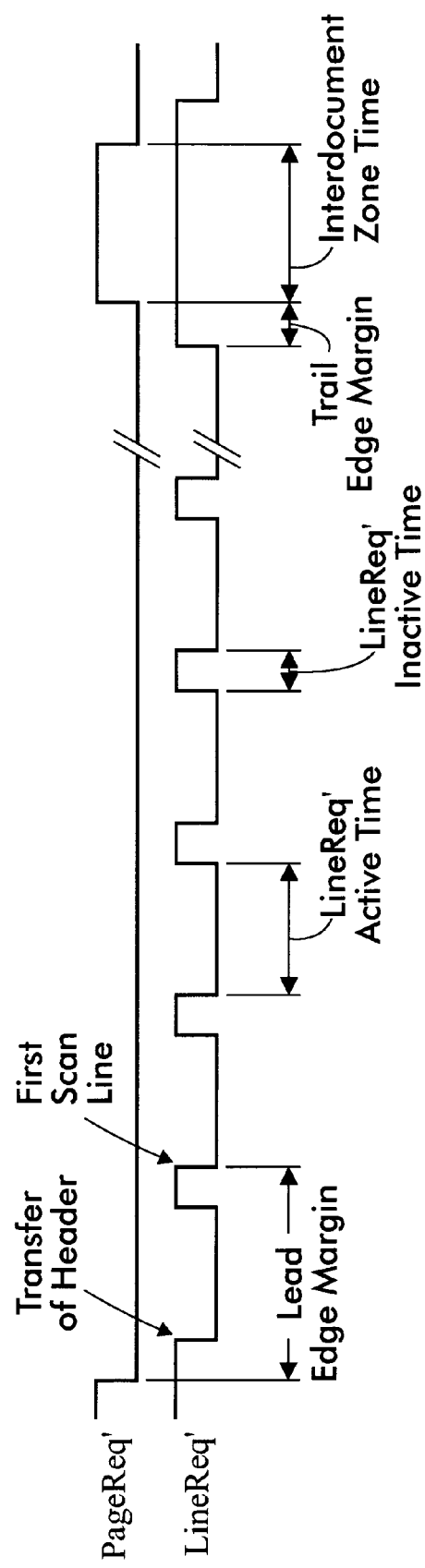
FIG. 4 shows the page request and line request timing relationships.

FIG. 4 shows the page request and line request timing relationship. The following section describes the terms used in the figure.

The lead edge margin time is the time between page request going active for the second time. The length of the lead edge margin varies depending on certain factors. The interface card does not transfer image data during the lead edge margin time.

The Line Valid active time controls the number of pixel transferred across the interface in the fast scan direction. The interface card drives margin and image data across the interface to put marks on paper in the line valid active time. The Line Valid active time, in terms of the number of pixels, is negotiated between the DFE and the Print Engine before the start of the page.

The length of the line request inactive time varies depending on print engine factors. The interface card does not transfer image data during this time.

The trail edge margin time is the time between the last line request going inactive and page request going inactive. The interface card does not transfer image data during this time.

The interpage gap time is the time that page request is inactive. The interface card does not transfer image data during this time. The intergap time varies depending on print engine factors.

There is a header field at the start of each image. This header field consists of 8 bytes of data that is used to indicate the image number. The rest of the line is filled with zeros. The print engine uses this header to keep track of the page images so that the pages will be printed in the correct order for one-sided or two-sided operation. The header is also used to test the integrity of the system. The header information is passed to the print controller by the renderer. The header data is not printed.

Figure 5:
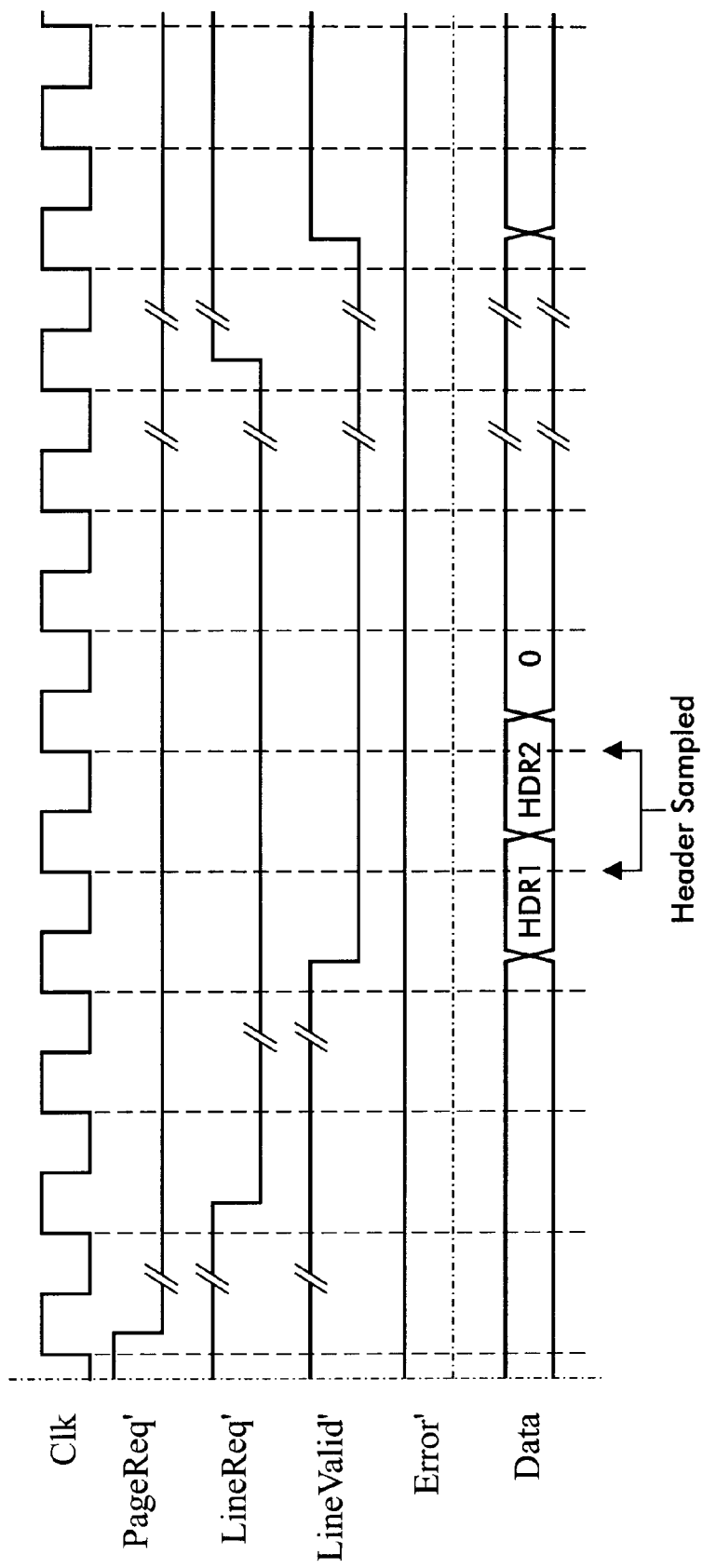
FIG. 5 shows the header data transfer timing.

The header field is sent from the front end to the renderer at the beginning of each image. After page request goes active, the first line request is used to transfer the header data FIG. 5 shows the first line request and header data transfer timing. The header field is always present.

Upon detecting page request and line request active after transfer of the header, the interface card drives the image data across the interface. The interface card continues to drive image data every clock until the entire line is sent.

The image data is arranged in the 32-bit word such that the lowest numbered pixel is in bits 31:24 and the highest numbered pixel is in bits 7:0 of the data. The least significant bit of each pixel is in the lower numbered bit (24, 16, 8, 0) of the byte, and the most significant bit of each pixel is in the higher numbered bit (31, 23, 15, 7) of the byte.

The image data pixel value of 0 corresponds to no ink, and the image data pixel value of 255 corresponds to full (saturated) ink. The image data pixel values between 0 and 255 correspond to partial ink with the amount of saturation increasing as the value increases.

Figure 6:
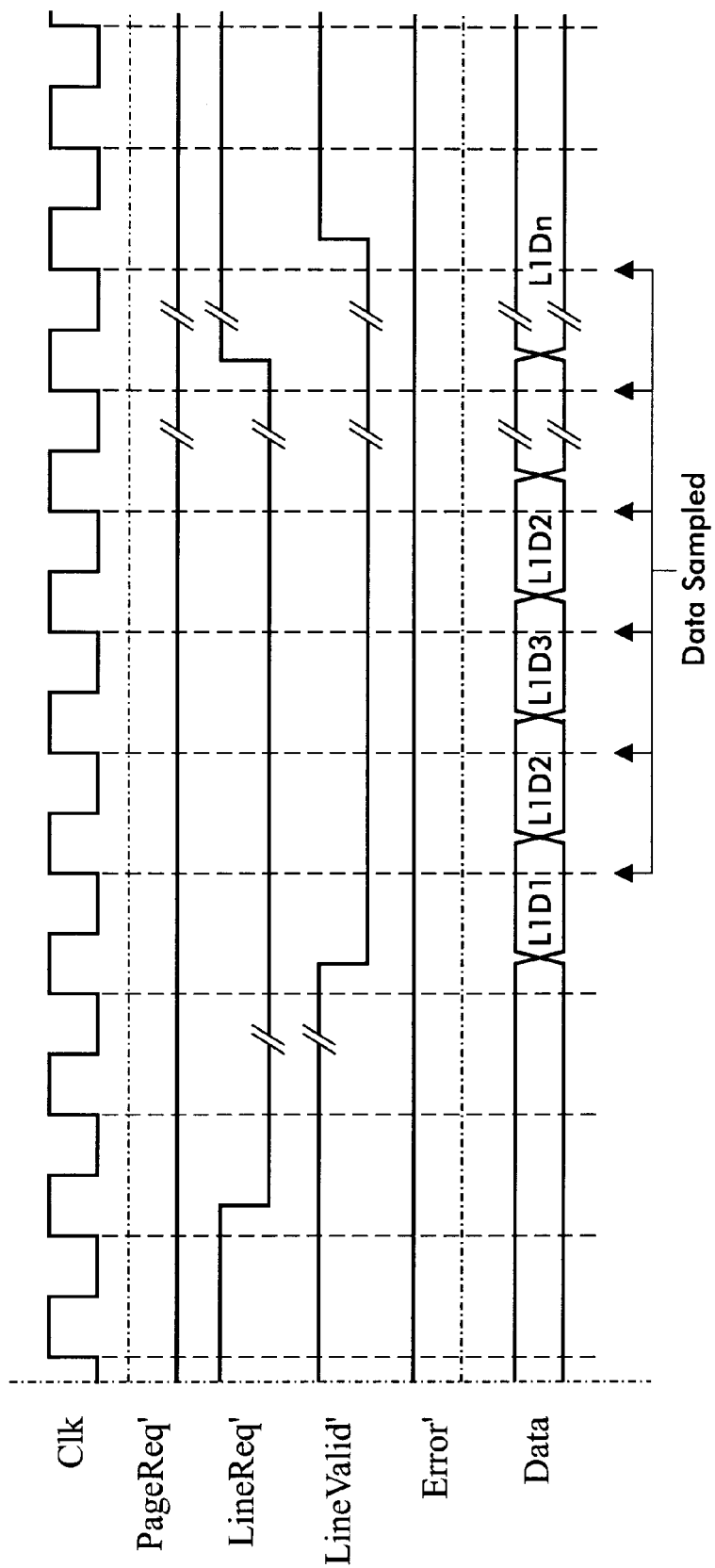
FIG. 6 shows the data transfer timing.

FIG. 6 shows the data transfer timing and FIG. 7 shows the interface pin assignments.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a system having a rendering means in a printer and a page description language decomposer, the improvement comprising an interface means responsive to the decomposer for generating and outputting through an interface to the rendering means in the printer a line valid signal and data signals, wherein the rendering means generates and outputs through the interface to the interface means page request and line request signals, and wherein the interface means is in the printer.

2. The system of claim 1 wherein there is an interface for each color separation.

3. The system of claim 1 wherein there is a communication link between the printer and a print server.

\* \* \* \* \*